(12) United States Patent
Accursi et al.

(10) Patent No.: US 11,490,759 B2
(45) Date of Patent: Nov. 8, 2022

(54) APPARATUS FOR MAKING BEVERAGES USING CAPSULES CONTAINING A FOOD SUBSTANCE

(71) Applicant: CAFFITALY SYSTEM S.P.A., Gaggio Montano (IT)

(72) Inventors: Giovanni Accursi, Alto Reno Terme (IT); Maurizio Diamanti, Castel di Casio (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 413 days.

(21) Appl. No.: 16/628,740

(22) PCT Filed: Jun. 22, 2018

(86) PCT No.: PCT/IB2018/054624
§ 371 (c)(1),
(2) Date: Jan. 6, 2020

(87) PCT Pub. No.: WO2019/021076
PCT Pub. Date: Jan. 31, 2019

(65) Prior Publication Data
US 2020/0281394 A1 Sep. 10, 2020

(30) Foreign Application Priority Data
Jul. 24, 2017 (IT) .......... 102017000084351

(51) Int. Cl.
*A47J 31/36* (2006.01)
*A47J 31/44* (2006.01)
*B65D 85/804* (2006.01)

(52) U.S. Cl.
CPC ....... *A47J 31/3633* (2013.01); *A47J 31/3638* (2013.01); *A47J 31/4492* (2013.01);
(Continued)

(58) Field of Classification Search
CPC ............... A47J 31/3633; A47J 31/3638; A47J 31/4492; B65D 85/8058; B65D 85/8046; B65D 2203/06
See application file for complete search history.

(56) References Cited

U.S. PATENT DOCUMENTS 10,130,211 B2 11/2018 Bugnano et al.
10,993,575 B2 5/2021 Krug et al.
(Continued)

FOREIGN PATENT DOCUMENTS

EP 3028608 A1 6/2016
EP 3175745 A1 6/2017
(Continued)

*Primary Examiner* — Anthony J Weier
(74) *Attorney, Agent, or Firm* — Pearne & Gordon LLP

(57) ABSTRACT

An apparatus for making beverages using capsules (2) containing a food substance, having at least one image acquisition device (13) suitable for capturing images in electronic format, which show at least one portion of a capsule (2) located in an image capture zone (14) and which operates in the visible spectrum, a lighting device (15) associated with the capture zone (14) for lighting with light in the visible spectrum said portion of a capsule (2), and a detecting device (17) for detecting the presence of a capsule (2) at the capture zone (14) and/or the arrival of a capsule (2) in the capture zone (14), the detecting device (17) being operatively associated with the lighting device (15) for causing the switching of the lighting device (15) from a switched off condition to a switched on condition, depending on the detection of the presence of a capsule (2) at the capture zone (14) and/or of the arrival of a capsule (2) in the capture zone (14).

19 Claims, 5 Drawing Sheets

(52) U.S. Cl.
CPC ..... *B65D 85/8046* (2013.01); *B65D 85/8058* (2020.05); *B65D 2203/06* (2013.01)

(56) References Cited

U.S. PATENT DOCUMENTS

| | | | |
|---|---|---|---|
| 2015/0201790 A1* | 7/2015 | Smith | A47J 31/0673 426/431 |
| 2016/0130076 A1* | 5/2016 | Jarisch | B65D 85/8058 426/87 |
| 2016/0157668 A1 | 6/2016 | Bugnano et al. | |
| 2016/0166105 A1 | 6/2016 | Bugnano et al. | |
| 2016/0242594 A1 | 8/2016 | Empl et al. | |
| 2017/0325620 A1 | 11/2017 | Rubin et al. | |
| 2017/0325626 A1 | 11/2017 | Rubin et al. | |
| 2018/0325305 A1 | 11/2018 | Aschwanden et al. | |
| 2018/0352996 A1 | 12/2018 | Krug et al. | |
| 2020/0154937 A1* | 5/2020 | Accursi | A47J 31/3633 |
| 2020/0205607 A1* | 7/2020 | Accursi | A47J 31/5253 |
| 2020/0281396 A1* | 9/2020 | Accursi | B65D 85/8058 |
| 2021/0106165 A1* | 4/2021 | Accursi | A47J 31/4403 |

FOREIGN PATENT DOCUMENTS

| | | |
|---|---|---|
| WO | 2015004551 A1 | 1/2015 |
| WO | 2015004552 A1 | 1/2015 |
| WO | 2015055849 A1 | 4/2015 |
| WO | 2017093178 A1 | 6/2017 |
| WO | 2017093201 A1 | 6/2017 |
| WO | 2017093202 A1 | 6/2017 |
| WO | 2017134544 A1 | 8/2017 |

* cited by examiner

APPARATUS FOR MAKING BEVERAGES USING CAPSULES CONTAINING A FOOD SUBSTANCE

This invention relates to an apparatus for making beverages using capsules containing a food substance. In the context of this invention, the food substance may be of any type (soluble or insoluble, powdered, granular, liquid, having one or multiple components, etc.).

At present there are many prior art types of apparatuses capable of making beverages, which, in general, comprise an extraction unit in which an extraction chamber is made, in which, in use, a capsule can be inserted. The extraction unit in turn comprises a first part and a second part which are movable, at least one relative to the other, between a home position, in which they are at a distance from each other and in which the extraction chamber is open for allowing a capsule to be positioned in it, and an extraction position, in which they are coupled to each other and close the extraction chamber. Depending on requirements, the movement of the first part and the second part relative to each other may be obtained manually or may be motor-driven, and may occur after specific commands by the user or automatically.

There are also means for making a beverage for, in use, making water (which may or may not be hot and pressurized) circulate through the capsule contained in the closed extraction chamber, thereby causing the beverage to be formed, and for supplying the beverage to the outside of the apparatus. There are also prior art apparatuses in which, one of either the first part or the second part is fixed and the other may be removed for loading the capsule in it and then refitted on the apparatus for making the beverage, and other apparatuses in which, in contrast, both the first part and the second part always remain associated with the rest of the apparatus and can only be moved towards and away from each other along more or less complex trajectories.

This latter type also includes apparatuses which also comprise capsule retaining means suitable for supporting, before supplying, a capsule still to be used in an intermediate position between the first part and the second part, when the extraction chamber is open. Such apparatuses in general have an infeed section where, in use, a capsule can be fed to the apparatus, and from which there extends a path for insertion of the capsule which extends to the retaining means and along which, in general, the capsule is fed by sliding due to gravity. When the movement of the first part and of the second part occurs along a substantially horizontal line, reference is made to apparatuses with a horizontal unit.

There are also many prior art apparatuses capable of recognising the type of capsule fed to the apparatus and on the basis of this determining the methods for supplying the beverage.

A first technology used for that purpose requires the capsule to bear an identifying element of the electromagnetic type (such as an RFID element) and the capsule to comprise a corresponding reader. Although that solution allows goods results in functional terms, it is not economically advantageous due to the need to use a disposable identifying element on each capsule. In contrast, a second technology currently used involves optical recognition of the capsule by means of a reading device suitable for reading information (for example, a bar code or a QR code) which are located on the capsule. When the optical recognition zone is positioned inside the machine, that is to say, in low or zero light conditions, the apparatus must also have a lighting device for lighting the portion of capsule bearing the information to be read. However, even this solution has disadvantages, in particular linked to the need to always keep the lighting device active. In fact, as well as involving a cost in terms of energy consumption and wear of the lighting device, that solution may be troublesome for the user due to light constantly coming out of the machine when it is switched on.

In an attempt to overcome this latter problem in some solutions optical reading occurred when the capsule was placed in the closed extraction chamber and, therefore, the lighting system was only activated with the chamber closed.

However, the positioning of the reading device inside the extraction chamber exposes that device to a high risk of dirtying.

In this context the technical purpose which forms the basis of this invention is to provide an apparatus for making beverages using capsules containing a food substance, which overcomes the above-mentioned disadvantages.

In particular the technical purpose of this invention to provide an apparatus using capsules for making beverages which allows the capsule to be recognised while minimising both energy consumption and the risk of dirtying.

A further technical purpose of this invention is to provide an apparatus using capsules for making beverages which has a reduced impact in terms of unwanted light emissions.

The technical purpose and the aims indicated are substantially fulfilled by an apparatus for making beverages using capsules containing a food substance in accordance with what is described in the appended claims.

Further features and the advantages of this invention are more apparent in the detailed description, with reference to the accompanying drawings which illustrate several preferred, non-limiting embodiments of an apparatus for making beverages using capsules containing a food substance, in which.

Figure 1:
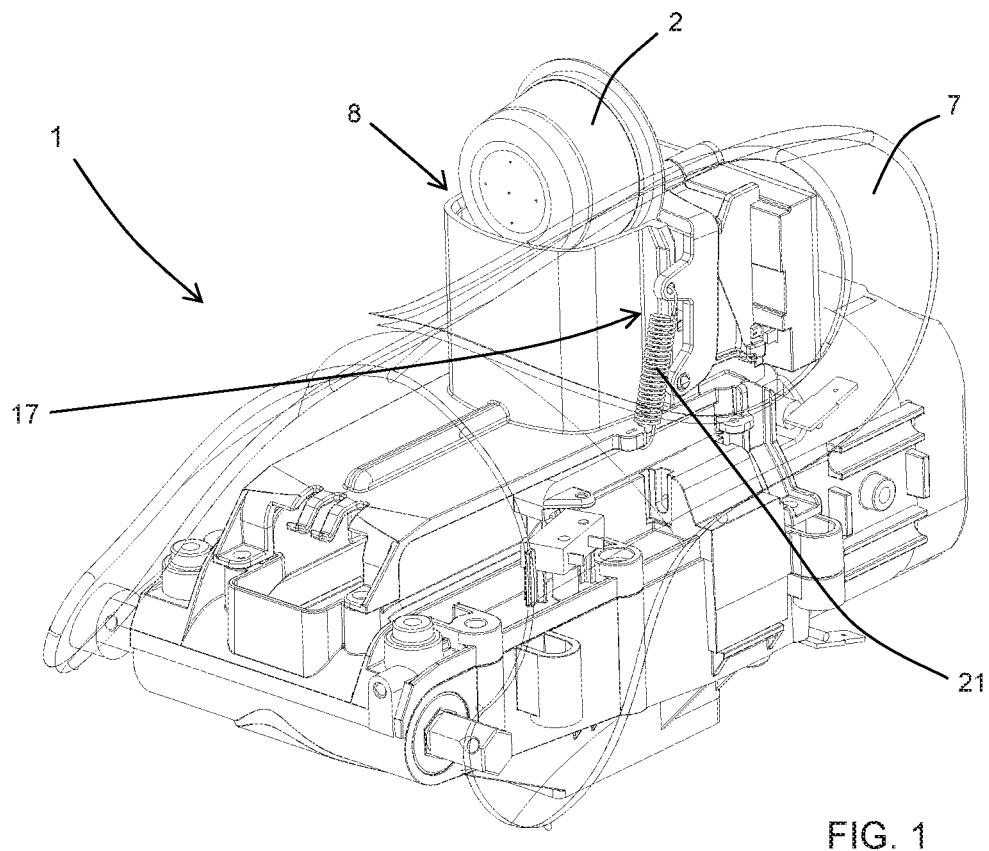
FIG. 1 is a three-quarter axonometric view of the inner part of an apparatus using capsules in accordance with this invention at the moment when a capsule has just started to enter the apparatus.
Figure 2:
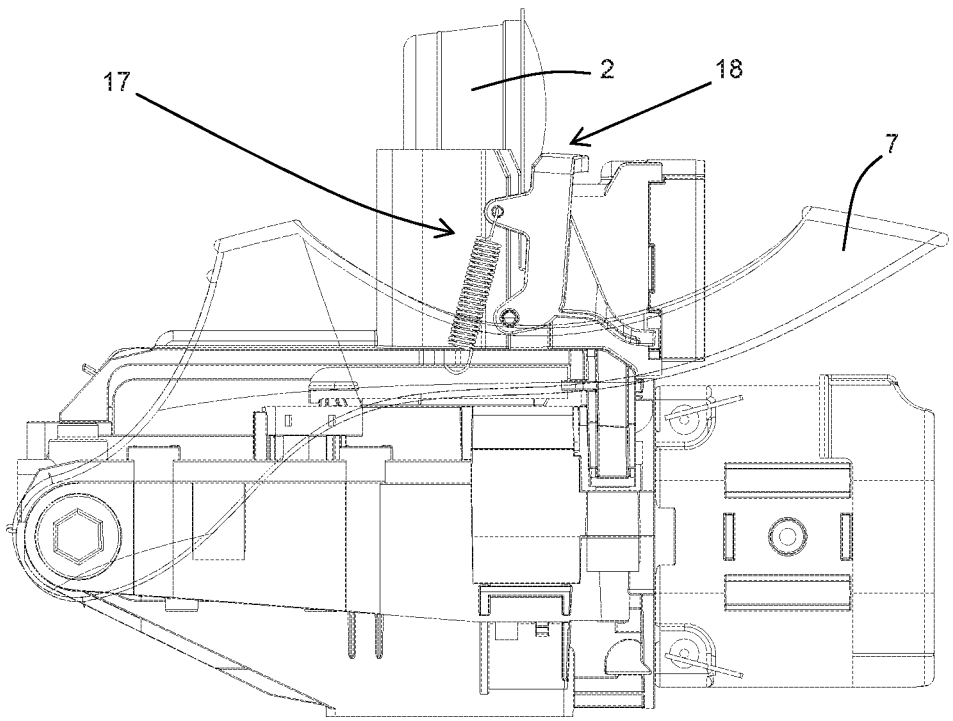
FIG. 2 is a side view of the apparatus of FIG. 1.
Figure 3:
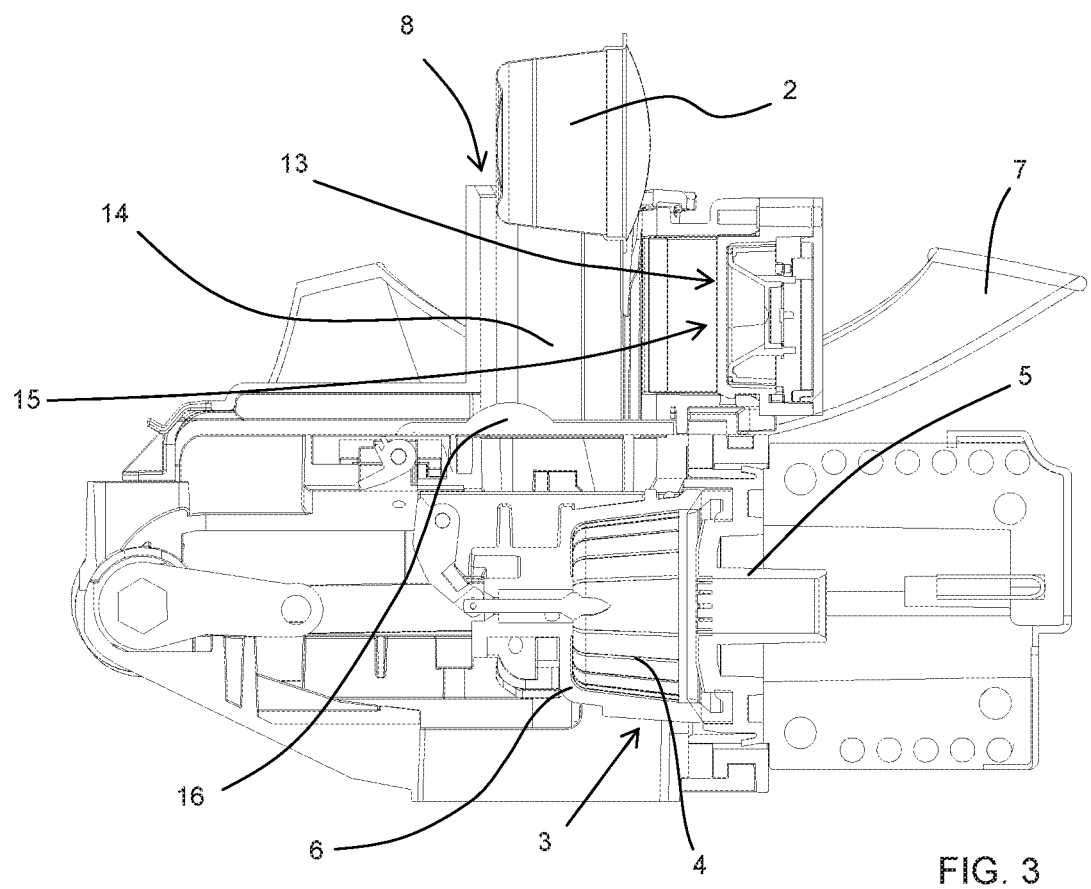
FIG. 3 shows the apparatus of FIG. 1 in cross-section according to a vertical section plane passing through a longitudinal axis of the apparatus.

It should be noticed that in order to make underlying parts visible, in the accompanying figures the apparatus extraction unit movement handle has always been shown as transparent.

With reference to the above-mentioned figures the numeral 1 denotes in its entirety an apparatus for making beverages using capsules 2 containing a food substance, made according to this invention.

Similarly to many prior art apparatuses, the apparatus according to this invention also comprises first an extraction unit 3 in which an extraction chamber 4 is made, in which in use a capsule 2 for extraction can be inserted.

The extraction unit 3 in turn comprises a first part 5 and a second part 6, at least one of which is movable relative to the other between a home position, in which they are at a distance from each other and in which the extraction chamber 4 is open to allow the insertion of a capsule 2 in it, and an extraction position in which they are coupled together and close the extraction chamber 4. In other words, when they are in the home position, the first part 5 and the second part 6 of the extraction unit 3 are far enough apart to allow a capsule 2 to be inserted in the extraction chamber 4. In contrast, when they are in the extraction position, they are coupled together so that they clamp a capsule 2 in the extraction chamber 4. During the extraction chamber 4 closing step, the capsule 2 may also be shifted axially. That happens in particular with horizontal axis units such as the one in the accompanying figures, in which one of either the first part 5 or the second part 6 is usually fixed. In the context of this invention the term extraction chamber 4 is used in a broad sense to identify the empty space present between the first part 5 and the second part 6 of the extraction unit 3, irrespective of their absolute position and their position relative to each other. The movement of the first part 5 and the second part 6 may be driven either manually (as in the accompanying figures where a handle 7 operates a movement shaft of a connecting rod—crank mechanism), or it may be motor-driven.

Depending on requirements, for example in the case of horizontal units, associated with the extraction chamber 4 there may be retaining means (not visible in the accompanying figures) suitable for retaining the capsule 2 positioned between the first part 5 and the second part 6 before closing of the extraction chamber 4 (that is to say, after the capsule 2 itself has been inserted in the machine).

The apparatus 1 also has an infeed section 8 where, in use, a capsule 2 can be fed to the apparatus 1. Extending from the infeed section 8 and as far as the extraction chamber 4 (to the retaining means if present) there is a capsule 2 insertion path.

There are also units for making a beverage which are suitable for, in use, making water circulate through a capsule 2 contained in the closed extraction chamber 4, thereby causing the beverage to be formed following the interaction between the water and the food substance, and for supplying the beverage from the closed extraction chamber 4 to the outside of the apparatus 1.

Those units for making a beverage, of the known type and not linked to the innovative aspects of this invention, comprise both a feeding circuit 9 for feeding water, which may or may not be pressurised, to the extraction chamber 4, and a supplying duct 10 for supplying the beverage made to the outside. If necessary (that is to say, if the capsule 2 is without openings), they may also comprise first piercing means 11 for making a first hole in the capsule 2 through which to feed the water into the capsule 2, and second piercing means 12 for making a second hole through which to allow the beverage to come out of the capsule 2. In any case, since the means for making the beverage are not part of the innovative aspects of this invention and are in themselves similar to the prior art ones, they will not be described in further detail herein.

According to this invention, the apparatus 1 also comprises at least one image acquisition device 13 which is positioned at an image capture zone 14 that is in turn located along the insertion path, upstream of the extraction chamber 4. The image acquisition device 13 is suitable in use for capturing images in electronic format, which show at least one portion of a capsule 2 located in the capture zone 14 (a portion of the lid in the embodiment illustrated). Advantageously, the image acquisition device 13 may comprise a digital camera or video camera, or more simply a sensor of the type used in digital cameras. It may also comprise further electronic components able to perform one or more operations on, or based on, the images acquired. According to the preferred embodiment of this invention of this invention the image acquisition device 13 also operates in the visible spectrum.

The apparatus 1 also comprises an electronic unit (not illustrated) connected to the image acquisition device 13 for receiving the images gathered by it, and to the means for making the beverage for controlling and commanding them. In particular, in the known way, the electronic unit is connected to the means for making the beverage for also controlling them depending on the images received from the image acquisition device 13.

Depending on requirements, for example, the electronic unit may in use examine the images received from the image acquisition device 13 either for enabling or not enabling operation of the means for making the beverage, or for automatically setting beverage supplying parameters used by the means for making the beverage, or for automatically supplying the beverage using the means for making the beverage. Whatever the case, recognition of the capsule 2 by means of interpretation of the images acquired is a necessary step for the subsequent authorization to supply the beverage.

In order to guarantee good quality image acquisition, according to this invention there is also a lighting device 15 associated with the capture zone 14, for in use lighting with light in the visible spectrum the capsule 2 located in the capture zone 14, at the portion of the capsule bearing the information to be detected. According to this invention, the lighting device 15 is switchable between a switched on condition in which it lights and a switched off condition. It should be noticed that the switched off condition may also be adopted (and is usually adopted for most of the time) when the entire apparatus 1 is switched on and ready to supply.

In the preferred embodiments in which the extraction unit 3 is of the horizontal type, there is also a capsule 2 retaining element 16, positioned in such a way that it can retain the capsule 2 in the capture zone 14. In particular, advantageously, the retaining element 16 is movable between a retaining position, in which in use it retains a capsule 2 at the capture zone 14, and a releasing position, in which in use it allows the capsule 2 to be fed from the capture zone 14 towards the extraction chamber 4. According to particularly preferred embodiments, the retaining element 16 may move together with the one of either the first part 5 or the second part 6, which is movable (as in the accompanying figures), so that it is in the retaining position when the first part 5 and the second part 6 are in the extraction position, and in the releasing position when the first part 5 and the second part 6 are in the home position; in particular the retaining element 16 may also be constituted of the one of either the first part 5 or the second part 6 that is movable.

In other embodiments, the retaining element 16 may also be connected to the extraction unit 3 in such a way that it moves in a synchronised way with the first part 5 and the second part 6. In particular, it may be positioned and connected in such a way that it is in the retaining position when the first part 5 and the second part 6 are in the home position or in the extraction position, and only shift temporarily into the releasing position during the movement of the first part 5 and/or of the second part 6 between the home position and the extraction position, for allowing the capsule 2 to be fed from the capture zone 14 to the extraction chamber 4.

According to one of the innovative aspects of this invention, the apparatus 1 also comprises a detecting device 17 operatively associated, directly or indirectly, with the lighting device 15 for causing the switching of the lighting device 15 from the switched off condition to the switched on condition, depending on a detection performed. In particular, the detecting device 17 is for detecting the presence of a capsule 2 at the capture zone 14, or the arrival of a capsule 2 in the capture zone 14, or both.

However, in the preferred embodiment, the function of the detecting device 17 is to detect the arrival of a capsule 2 in the capture zone 14. For that purpose, the detecting device 17 detects the transit of a whole capsule 2 at a detecting zone 18 located immediately upstream of the capture zone 14.

Whilst in other embodiments it may also be constituted of a contactless sensor which directly observes the capsule 2 (such as a photocell), in the case of embodiments similar to those illustrated in the accompanying figures, the detecting device 17 comprises a rigid activating element 19 associated with the capture zone 14 and with an electric switch 20 controlled by the activating element 19.

The activating element 19 is movable between a first position in which it interferes with the capsule 2 insertion path, and a second position in which it does not interfere with the insertion path. Advantageously, there is also at least one return element 21, preferably elastic, connected between the activating element 19 and a fixed portion of the apparatus 1 (or of the extraction unit 3) and suitable for always returning the activating element 19 towards the first position in the absence of external stresses. In this embodiment, the arrival of a capsule 2 in the capture zone 14 always corresponds to the passage in sequence of the activating element 19 from the first position to the second position and from the second position to the first position. It is, therefore, sufficient to monitor the position of the activating element 19 in order to detect the arrival of the capsule 2 in the capture zone 14.

Figure 4:
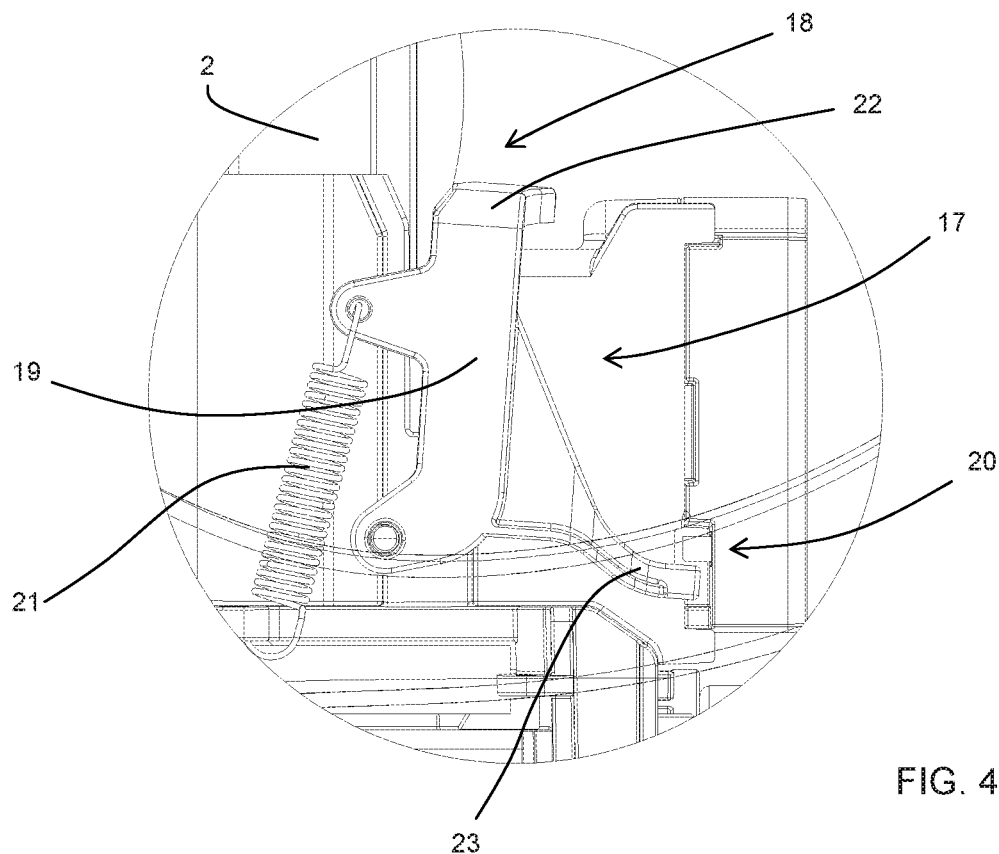
FIG. 4 is an enlarged detail of the apparatus of FIG. 2.
Figure 5:
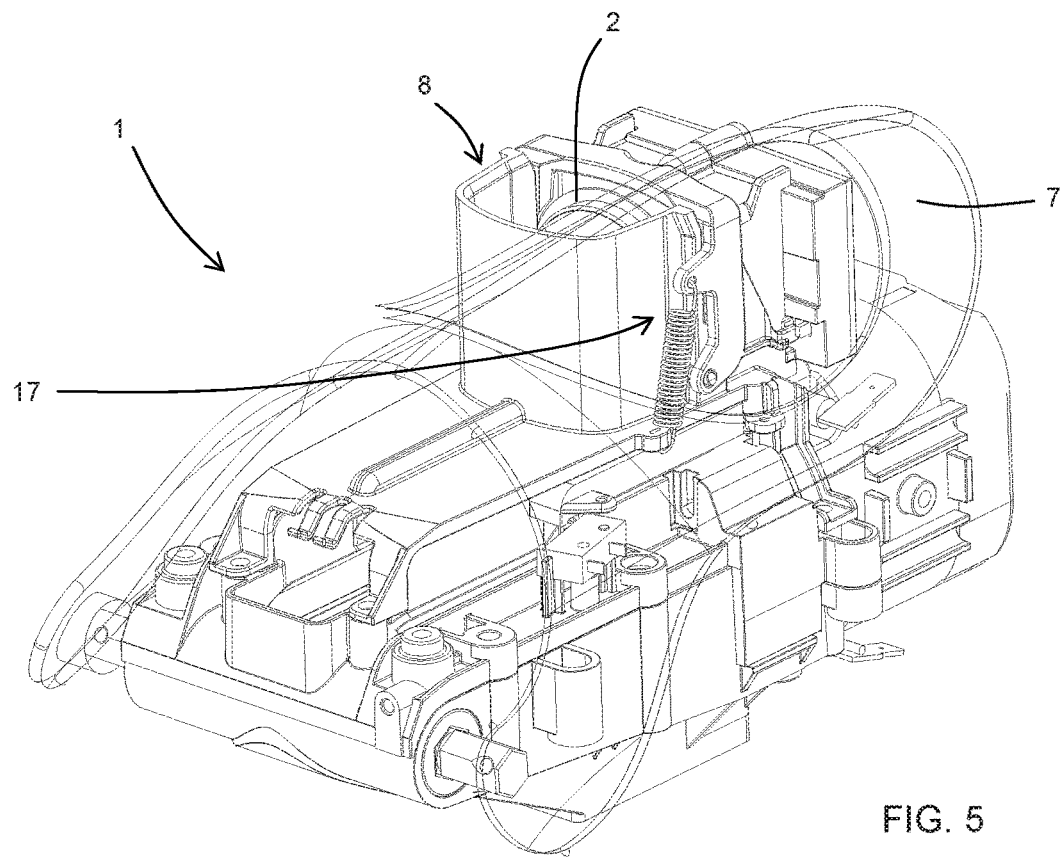
FIG. 5 is a three-quarter axonometric view of the apparatus of FIG. 1 at the moment when the capsule has reached an image capture zone.
Figure 6:
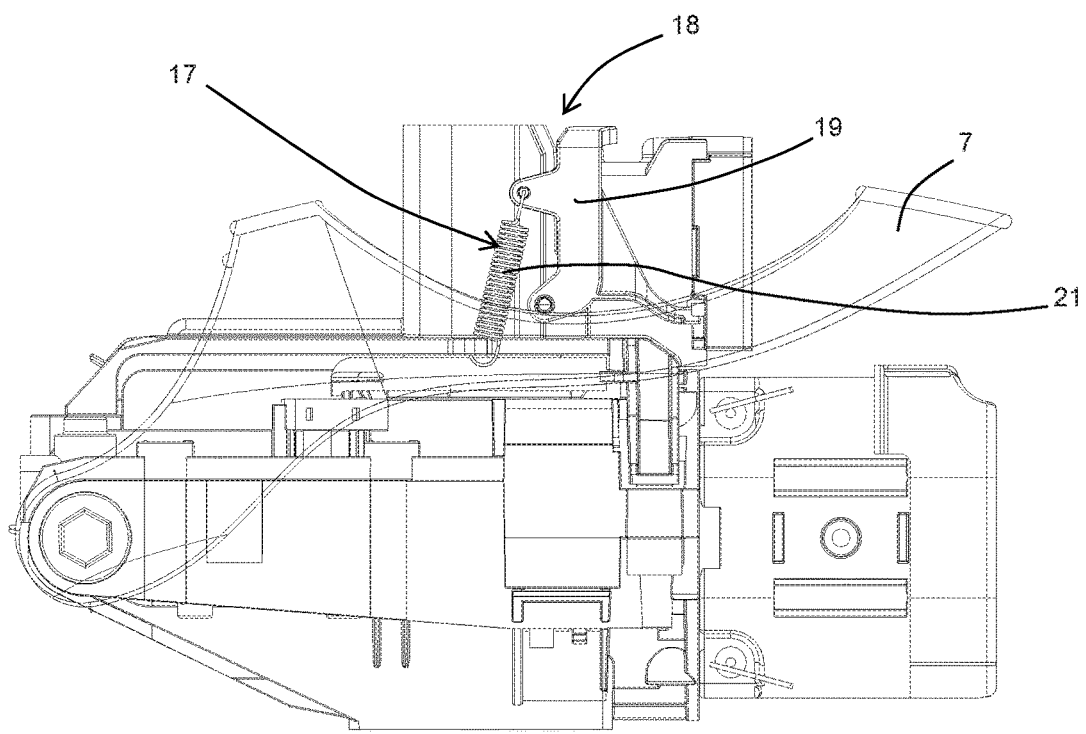
FIG. 6 is a side view of the apparatus of FIG. 5.
Figure 7:
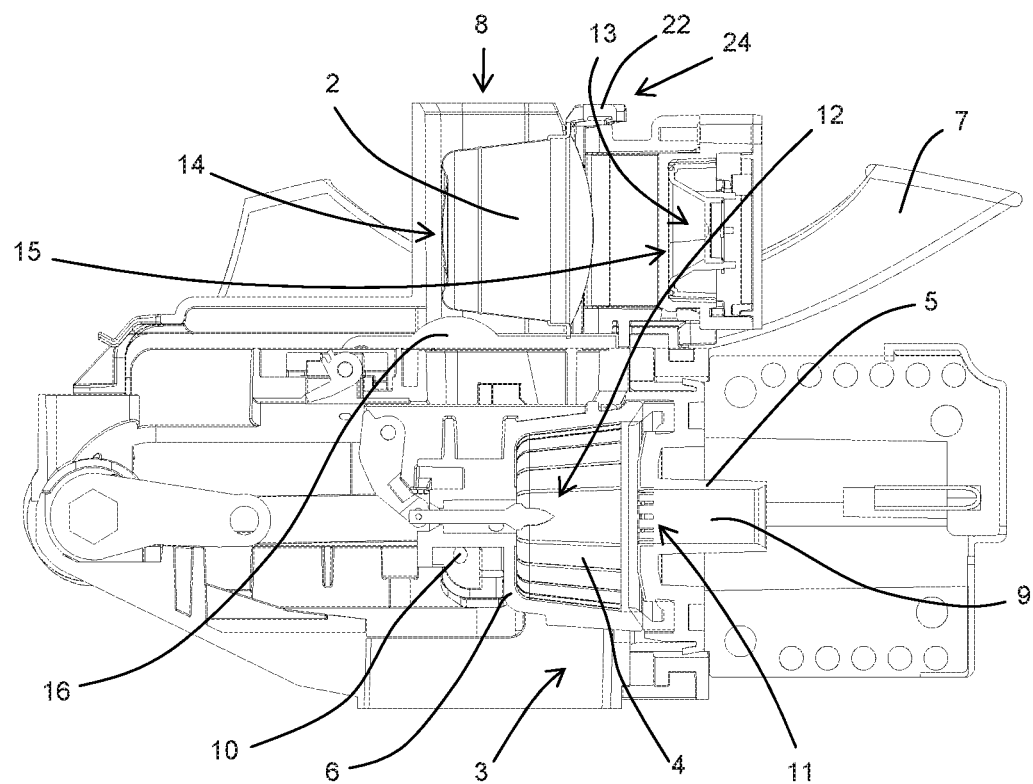
FIG. 7 shows the apparatus of FIG. 5 in cross-section according to a vertical section plane passing through a longitudinal axis of the apparatus.
Figure 8:
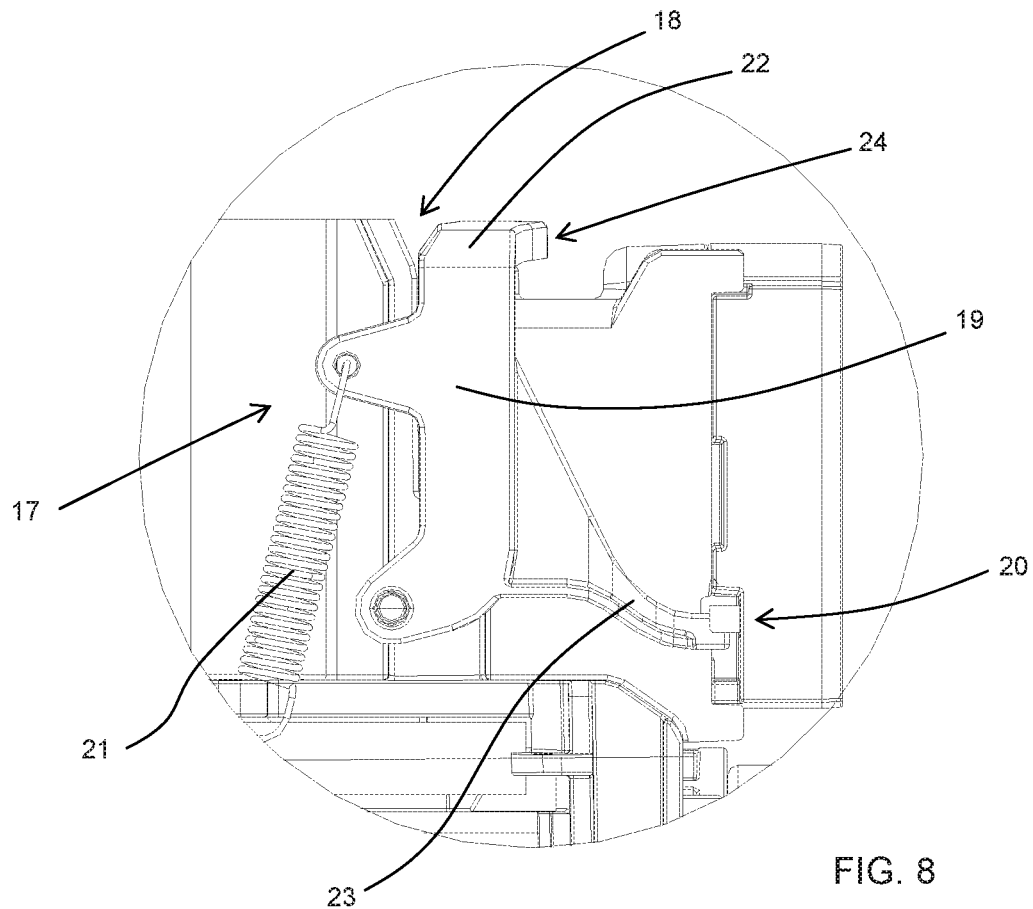
FIG. 8 is an enlarged detail of the apparatus of FIG. 6.

In particular, in the embodiment illustrated the activating element 19 is constituted of a tilting rigid body which on one side has a shaped bar 22 associated with the insertion path, and on the other side has at least one arm 23 which is operatively associated with the switch. As shown in FIG. 4, the shaped bar 22 has one face facing the infeed section 8 shaped in such a way as to act as sloping surface, that is to say, in such a way that a pressure applied on it by the capsule 2 during feeding along the insertion path causes a rotation of the activating element 19 towards the second position.

Figure 10:
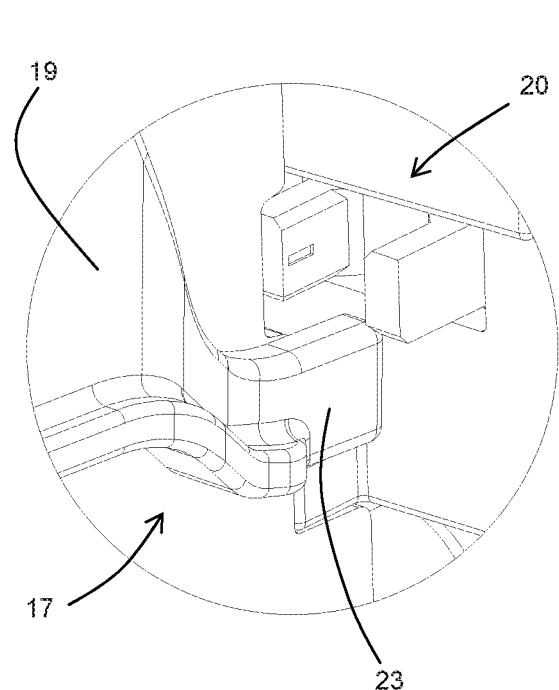
FIGS. 10 and 11 are enlarged views in comparison of two corresponding details of FIGS. 1 and 5.
Figure 11:
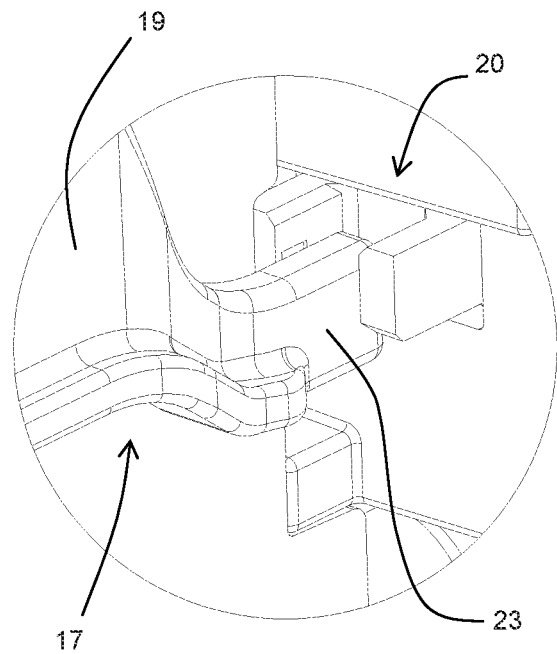

In the preferred embodiment, for monitoring the position of the activating element 19, the detecting device 17 also comprises an electric switch 20 switchable between two separate conditions (preferably between a circuit made condition and a circuit broken condition). The electric switch 20 may be of the contact type (solution not illustrated) or without contact (solution adopted in the embodiment illustrated in which it is of the photocell optical type and the arm 23 of the activating element 16 intercepts its light beam when the activating element 19 is in the first position—see FIGS. 10 and 11. Moreover, the activating element 19, when in the first position, causes or allows the electric switch 20 to be held in a first condition, whilst when the activating element is in the second position it causes and/or allows the electric switch 20 to be held in a second condition.

In the preferred embodiment, the electric switch 20 is electrically connected to the electronic unit for transmitting to it a first electric signal when it is in the first condition and a second electric signal when it is in the second condition. The electronic unit is connected to the lighting device 15 for causing the switching of the lighting device 15 from the switched off condition to the switched on condition depending on the electric signal received from the electric switch 20. In particular, in the preferred embodiment the electronic unit is connected to the lighting device 15 for causing the switching of the lighting device 15 from the switched off condition to the switched on condition every time that the signal received from the electric switch 20 switches first from the first signal to the second signal and then from the second signal to the first signal again, at most within a predetermined time interval (for example, 2 seconds). Based on the same criterion, the electronic unit also commands the acquisition of the images of the capsule 2 and their processing depending on beverage supplying.

As already indicated, since the acquisition of good quality images requires the capsule 2 to be lit, the electronic unit is in fact preferably connected to the image acquisition device 13 for commanding its acquisition of images only when the lighting device 15 is in the switched on condition.

Lighting switch off is preferably performed automatically when a predetermined time has elapsed since switch on. For that purpose, the electronic unit is preferably connected to the lighting device 15 for causing the switching of the lighting device 15 from the switched on condition to the switched off condition when a predetermined switched on time has elapsed since the electronic unit previously caused the switching of the lighting device 15 from the switched off condition to the switched on condition.

Advantageously, the electronic unit is configured for resetting any recognitions already performed or in progress, whenever a new shifting of the activating element 19 from the first position towards the second position is detected before the beverage supplying process has finished. Therefore, in this way, it is possible to avoid malfunctions caused, for example, by substitution of a capsule 2 with a different capsule after the first has already been recognised and supplying has consequently been enabled or set, but not yet performed.

According to a particularly preferred embodiment of this invention, the apparatus 1 also comprises an obstructing element 24 for obstructing the removal of a capsule 2 from the capture zone 14. That obstructing element 24 is positioned along the capsule 2 insertion path, upstream of the capture zone 14. Moreover, preferably, it is movable between an engaged position in which it interferes with the capsule 2 insertion path and opposes the removal of a capsule 2 from the capture zone 14 towards the infeed section 8, and a disengaged position in which it does not interfere with the insertion path. Advantageously, the obstructing element 24 for obstructing the removal of a capsule 2 from the capture zone 14 is constituted of the activating element 19 (in the embodiment illustrated, of its shaped bar 22).

Operation of the apparatus 1 according to this invention is similar to that of traditional machines in terms of supplying the beverage, whilst it differs in the steps preceding closing of the extraction chamber 4.

In fact, the capsule 2 is inserted in the apparatus 1 at the infeed section 8 and slides along the insertion path towards the capture zone 14. When it reaches the activating element 19, it shifts the later from the first position to the second position (acting on the shaped bar 22 in the embodiment illustrated in the accompanying figures) and continues to the capture zone 14. As soon as the entire capsule 2 has disengaged from the activating element 19, the latter returns to the first position thanks to the action of the elastic element. At that point the processing unit will have detected a double switching of the signal emitted by the switch, first from the first signal to the second signal, and then from the second signal to the first signal. If that double switching took place within the maximum time allowed, the processing unit on one hand switches the lighting device 15 to the switched on condition and on the other hand activates acquisition of images by the image acquisition device 13. As can easily be guessed, acquisition of the image may occur in a very limited time period after the processing unit detects the double switching of the switch (roughly within one second or less).

Then, on one hand the image of the capsule 2 is processed in a known way (for example, by comparing it with others saved or reading a code visible in it) and if the result of processing is positive, the processing unit allows supplying to continue.

Figure 9:
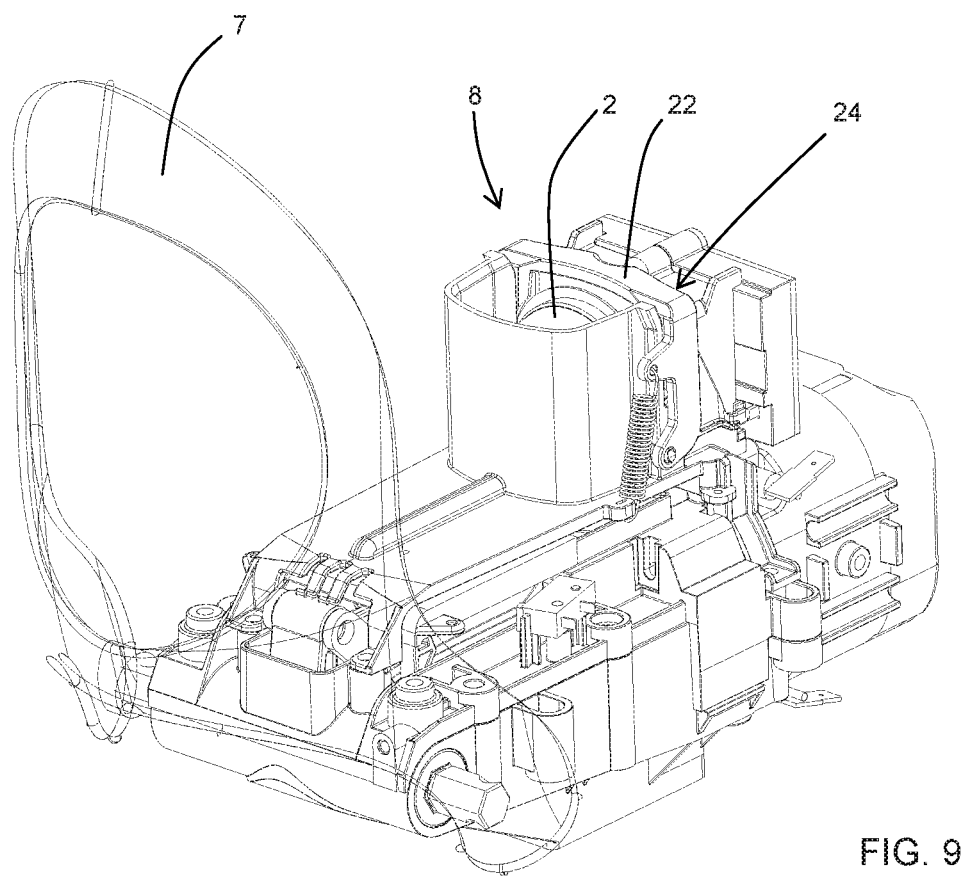
FIG. 9 is a three-quarter axonometric view of the apparatus of FIG. 1 with a handle for moving the extraction unit rotated and the capsule free to proceed from the image capture zone towards the extraction chamber.

On the other hand, the capsule 2 is fed further until it reaches the open extraction chamber 4, if necessary acting on the retaining element 16 (manually or motor-driven). With regard to this, it should be noticed that in the embodiment illustrated, in which the retaining element 16 moves together with the movable part of the extraction unit 3, the capsule 2 is inserted as far as the capture zone 14 with the extraction chamber 4 closed. In order to then make it enter the extraction chamber 4, the handle 7 must be operated for opening the chamber (FIG. 9) and then closing it again.

At that point, supplying can finally take place.

If, in contrast, the result of image processing was negative (there was no recognition), the processing unit may alternatively prevent supplying, set safety supplying parameters, or supply automatically using those safety supplying parameters (that is to say, parameters which cannot cause damage to the apparatus 1 even in the event of supplying in the presence of a capsule 2 that is particularly unsuitable for the apparatus 1).

This invention brings important advantages.

First, thanks to this invention it has been possible to provide an apparatus using capsules for making beverages which allows the capsule to be recognised while minimising both energy consumption and wear on the electronic components intended for lighting and image acquisition (slashing the time during which they are used), all by acting outside the extraction chamber and reducing if not eliminating the risk of dirtying.

Second, thanks to this invention it has been possible to provide an apparatus using capsules for making beverages in which unwanted light emissions are almost completely eliminated.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for making beverages using capsules containing a food substance, comprising:
    an extraction unit (3) in which an extraction chamber (4) is made in which, in use, a capsule (2) can be inserted, the extraction unit (3) in turn comprising a first part (5) and a second part (6), at least one of which is movable relative to the other between a home position, in which the two parts are at a distance from one another and in which the extraction chamber (4) is open to allow the insertion of a capsule (2) in it, and an extraction position in which the two parts are coupled together and close the extraction chamber (4);
    an infeed section (8) where, in use, a capsule (2) can be fed to the apparatus (1), a path for insertion of the capsule (2) in the apparatus (1) extending from the infeed section (8) to the extraction chamber (4);
    units for making a beverage suitable for, in use, making water circulate through a capsule (2) contained in the closed extraction chamber (4), thereby causing the beverage to be formed following the interaction between the water and the food substance, and for supplying the beverage from the closed extraction chamber (4) to the outside of the apparatus (1);
    at least one image acquisition device (13) positioned at an image capture zone (14) that is located along the insertion path, upstream of the extraction chamber (4); the image acquisition device (13) being suitable in use for capturing images in electronic format, which show at least one portion of a capsule (2) located in the capture zone (14); the image acquisition device (13) also operating at least in the visible spectrum;
    an electronic unit connected both to the image acquisition device (13) for receiving the images gathered by it, and to the units for making the beverage for controlling and/or commanding them depending on the images received;
    a lighting device (15) associated with the capture zone (14) for lighting with light in the visible spectrum said portion of a capsule (2) that in use is positioned in the capture zone (14), the lighting device (15) being switchable between a switched on condition in which it lights and a switched off condition; and
    a detecting device (17) for detecting the presence of a capsule (2) at the capture zone (14) and/or the arrival of a capsule (2) in the capture zone (14), the detecting device (17) being operatively associated with the lighting device (15) for causing the switching of the lighting device (15) from the switched off condition to the switched on condition, depending on a detection by the detecting device (17).

2. The apparatus according to claim 1, wherein the detecting device (17) comprises an electric switch (20) and an activating element (19) associated with the electric switch (20) for switching it between two separate conditions, the activating element (19) also being associated with the capture zone (14) and movable between a first position in which it interferes with the capsule (2) insertion path and causes and/or allows the electric switch (20) to be held in a first condition, and a second position in which it does not interfere with the insertion path and causes and/or allows the electric switch (20) to be held in a second condition.

3. The apparatus according to claim 2, wherein the electric switch (20) is electrically connected to the electronic unit for transmitting to it a first electric signal when it is in the first condition and a second electric signal when it is in the second condition, the electronic unit also being connected to the lighting device (15) for causing the switching of the lighting device (15) from the switched off condition to the switched on condition depending on the electric signal received from the electric switch (20).

4. The apparatus according to claim 3, wherein the electronic unit is connected to the lighting device (15) for causing the switching of the lighting device (15) from the switched off condition to the switched on condition when, at most within a predetermined time interval, the signal received from the electric switch (20) switches first from the first signal to the second signal and then from the second signal to the first signal again.

5. The apparatus according to claim 3, wherein the electronic unit is connected to the lighting device (15) for causing the switching of the lighting device (15) from the switched on condition to the switched off condition when a predetermined switched on time has elapsed since the electronic unit previously caused the switching of the lighting device (15) from the switched off condition to the switched on condition.

6. The apparatus according to claim 2, wherein the detecting device (17) also comprises at least one return element (21) connected to the activating element (19) for returning it towards its first position.

7. The apparatus according to claim 1, wherein it also comprises an obstructing element (24) for obstructing the removal of a capsule (2) from the capture zone (14) that is positioned along the capsule (2) insertion path upstream of the capture zone (14).

8. The apparatus according to claim 7, wherein the obstructing element (24) for obstructing the removal of a capsule (2) from the capture zone (14) is movable between an engaged position in which it interferes with the capsule (2) insertion path and opposes the removal of a capsule (2) from the capture zone (14) towards the infeed section (8), and a disengaged position in which it does not interfere with the insertion path.

9. The apparatus according to claim 2, wherein it also comprises an obstructing element (24) for obstructing the removal of a capsule (2) from the capture zone (14) that is positioned along the capsule (2) insertion path upstream of the capture zone (14), wherein the obstructing element (24) for obstructing the removal of a capsule (2) from the capture zone (14) is movable between an engaged position in which it interferes with the capsule (2) insertion path and opposes the removal of a capsule (2) from the capture zone (14) towards the infeed section (8), and a disengaged position in which it does not interfere with the insertion path, and wherein the obstructing element (24) for obstructing the removal of a capsule (2) from the capture zone (14) is constituted of the activating element (19).

10. The apparatus according to claim 1, wherein the electronic unit is also connected to the image acquisition device (13) for commanding its acquisition of images only when the lighting device (15) is in the switched on condition.

11. The apparatus according to claim 1, wherein it also comprises a capsule (2) retaining element (16) movable between a retaining position, in which in use it retains a capsule (2) at the capture zone (14), and a releasing position, in which in use it allows the capsule (2) to be fed from the capture zone (14) towards the extraction chamber (4).

12. The apparatus according to claim 1, wherein the electronic unit in use examines the images received from the image acquisition device (13) either for enabling or not enabling operation of the units for making the beverage, or for automatically setting beverage supplying parameters used by the units for making the beverage, or for automatically supplying the beverage using the units for making the beverage.

13. The apparatus according to claim 2, wherein the electric switch (20) is electrically connected to the electronic unit for transmitting to it a first electric signal when it is in the first condition and a second electric signal when it is in the second condition, the electronic unit also being connected to the lighting device (15) for causing the switching of the lighting device (15) from the switched off condition to the switched on condition depending on the electric signal received from the electric switch (20).

14. The apparatus according to claim 13, wherein the electronic unit is connected to the lighting device (15) for causing the switching of the lighting device (15) from the switched off condition to the switched on condition when, at most within a predetermined time interval, the signal received from the electric switch (20) switches first from the first signal to the second signal and then from the second signal to the first signal again.

15. The apparatus according to claim 13, wherein the detecting device (17) also comprises at least one return element (21) connected to the activating element (19) for returning it towards its first position.

16. The apparatus according to claim 2, wherein it also comprises an obstructing element (24) for obstructing the removal of a capsule (2) from the capture zone (14) that is positioned along the capsule (2) insertion path upstream of the capture zone (14).

17. The apparatus according to claim 3, wherein it also comprises an obstructing element (24) for obstructing the removal of a capsule (2) from the capture zone (14) that is positioned along the capsule (2) insertion path upstream of the capture zone (14).

18. The apparatus according to claim 2, wherein it also comprises a capsule (2) retaining element (16) movable between a retaining position, in which in use it retains a capsule (2) at the capture zone (14), and a releasing position, in which in use it allows the capsule (2) to be fed from the capture zone (14) towards the extraction chamber (4).

19. The apparatus according to claim 2, wherein the electronic unit in use examines the images received from the image acquisition device (13) either for enabling or not enabling operation of the units for making the beverage, or for automatically setting beverage supplying parameters used by the units for making the beverage, or for automatically supplying the beverage using the units for making the beverage.

\* \* \* \* \*